US012339688B2

(12) United States Patent
Izuhara

(10) Patent No.: US 12,339,688 B2
(45) Date of Patent: Jun. 24, 2025

(54) DEVICE WITH BUILT-IN REGENERATIVE CIRCUIT

(71) Applicant: TOYOTA JIDOSHA KABUSHIKI KAISHA, Toyota (JP)

(72) Inventor: Hiroki Izuhara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/469,928

(22) Filed: Sep. 19, 2023

(65) Prior Publication Data

US 2024/0210973 A1 Jun. 27, 2024

(30) Foreign Application Priority Data

Dec. 21, 2022 (JP) ................................. 2022-204505

(51) Int. Cl.
*G05F 1/56* (2006.01)

(52) U.S. Cl.
CPC ...................................... *G05F 1/56* (2013.01)

(58) Field of Classification Search
CPC ........................................................ G05F 1/56
See application file for complete search history.

(56) References Cited

U.S. PATENT DOCUMENTS

| | | | | |
|---|---|---|---|---|
| 6,538,341 | B1 * | 3/2003 | Lang | H02J 7/0044 307/18 |
| 9,351,365 | B2 * | 5/2016 | Saes | H05B 45/48 |

FOREIGN PATENT DOCUMENTS

| | | |
|---|---|---|
| JP | 2021-156075 A | 10/2021 |

* cited by examiner

*Primary Examiner* — Jared Fureman
*Assistant Examiner* — Duc M Pham
(74) *Attorney, Agent, or Firm* — SoraIP, Inc.

(57) ABSTRACT

The device with built-in regenerative circuit of the present disclosure includes a regenerative circuit, and the regenerative circuit determines a plurality of types of power sources having different input voltages, and sets a regeneration start voltage corresponding to the determined voltage of the power source. According to the present disclosure, it is possible to provide a regenerative circuit built-in device capable of performing circuit protection suitable for the type of power supply without separately preparing a transformer.

2 Claims, 6 Drawing Sheets

1

DEVICE WITH BUILT-IN REGENERATIVE CIRCUIT

CROSS-REFERENCE TO RELATED APPLICATION

This application claims priority to Japanese Patent Application No. 2022-204505 filed on Dec. 21, 2022, incorporated herein by reference in its entirety.

BACKGROUND

1. Technical Field

The present disclosure relates to a device with a built-in regenerative circuit.

2. Description of Related Art

Japanese Unexamined Patent Application Publication No. 2021-156075 (JP 2021-156075 A) discloses an opening and closing device for an electric opening and closing shutter as a device that supports both a commercial power supply and a battery power supply. The device according to JP 2021-156075 A includes a regenerative circuit that absorbs regenerative power generated by a back electromotive force. JP 2021-156075 A discloses that the battery power supply is transformed to the same voltage as the commercial power supply when the device is driven by the battery power supply.

SUMMARY

In the device according to JP 2021-156075 A, the regeneration start voltage of the regenerative circuit is the same voltage when either of the commercial power supply and the battery power supply is used. Therefore, the device according to JP 2021-156075 A cannot perform circuit protection suitable for the type of the power supply unless a transformer is used.

An object of the present disclosure is to address such an issue, and to provide a device with a built-in regenerative circuit capable of performing circuit protection suitable for the type of the power supply without separately preparing a transformer.

An aspect of the present disclosure provides a device with a built-in regenerative circuit, including a regenerative circuit, in which the regenerative circuit determines a plurality of types of power supplies having different input voltages; and sets a regeneration start voltage corresponding to the input voltage of the determined power supply.

According to the present disclosure, it is possible to provide a device with a built-in regenerative circuit capable of performing circuit protection suitable for the type of the power supply without separately preparing a transformer.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
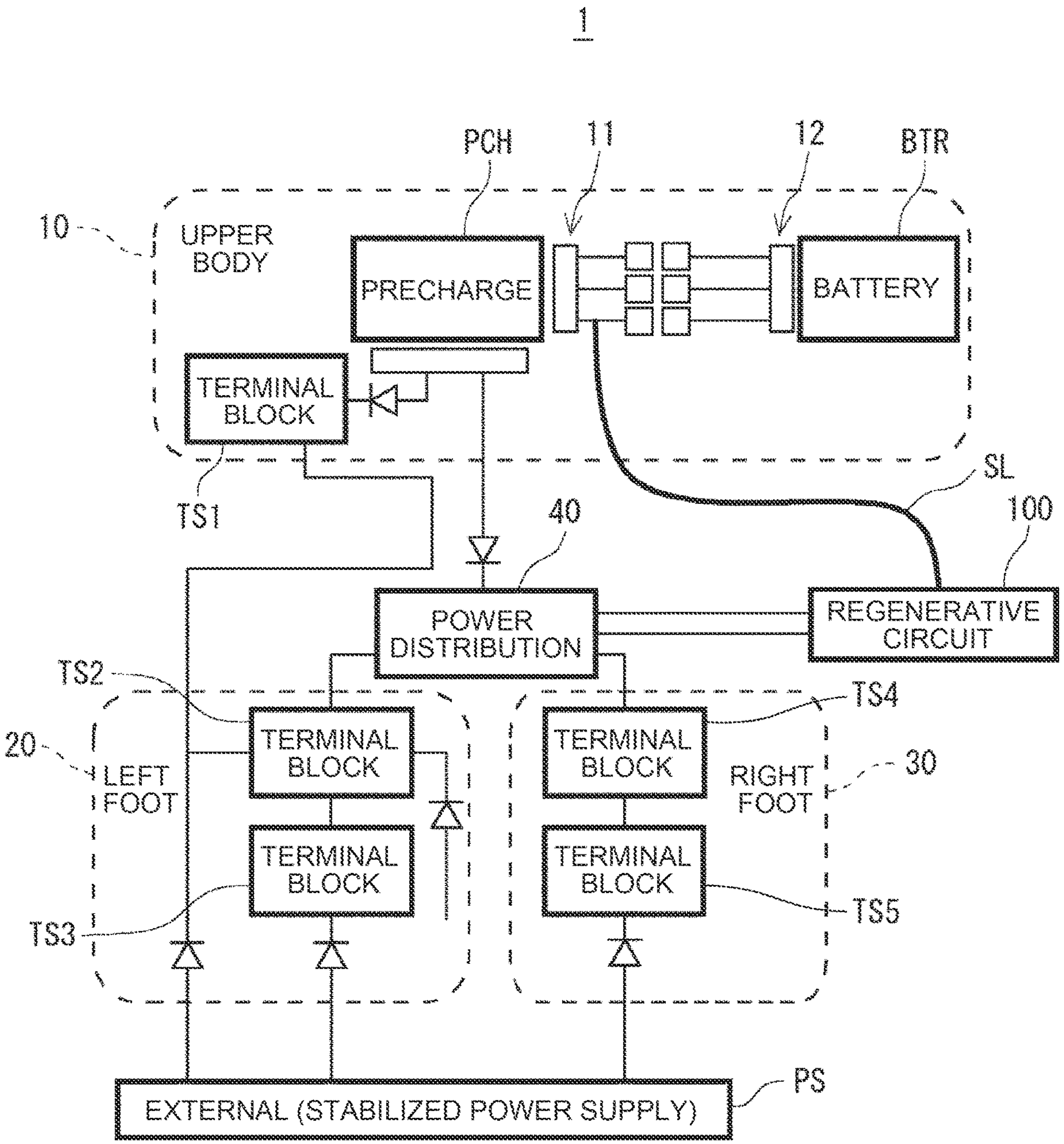
FIG. 1 is a configuration diagram illustrating a wiring configuration of a power system of a robot including a regenerative circuit according to an embodiment.

Hereinafter, a specific configuration of the present embodiment will be described with reference to the drawings. The following description shows preferred embodiments of the present disclosure, and the scope of the present disclosure is not limited to the following embodiments. Further, not all of the configurations described in the present embodiment are essential as means for solving the problem. In order to clarify the explanation, the following description and drawings have been omitted or simplified as appropriate. In each drawing, the same elements are designated by the same reference signs, and duplicate explanations are omitted as necessary.

Embodiments

A device with a built-in regenerative circuit according to an embodiment will be described. The device with built-in regenerative circuit of the present embodiment includes a regenerative circuit.

The regenerative circuit is provided in a device such as a robot or a mobile device, for example. The regenerative circuit is connected to a power line that supplies power from the power source to the device. A general regenerative circuit has a function of releasing an overvoltage to a regenerative resistor or the like when an overvoltage is generated in a power supply line due to a back electromotive force of a motor, an inrush voltage, or the like. The regenerative circuit protects the circuit of the device by such a function so that the circuit of the device does not become equal to or higher than a preset voltage.

As seen in the recent trend of electrification, devices such as robots and mobility devices are increasingly powered by batteries. However, in the examination stage and the like, there is a phase in which evaluation and construction are carried out while switching between driving by a battery and driving by a separate power supply.

In this case, the voltage of the battery and the voltage of the separate power supply may not necessarily be the same. In the case where the battery is at a high voltage and the separate power supply is at a low voltage, it is necessary to set the regeneration start voltage individually for each voltage in order to protect the circuit of the device.

The regenerative circuit built-in device of the present embodiment includes a regenerative circuit having a mechanism for determining whether the drive mode is a battery or a separate power supply. Further, the device with built-in regenerative circuit of the present embodiment includes a regenerative circuit having a mechanism capable of changing the regeneration start voltage for each of the battery and the separate power supply.

According to the above-described feature, the device with built-in regenerative circuit of the present embodiment can individually set the regeneration start voltage for each voltage of the plurality of power supplies. Further, the device with built-in regenerative circuit of the present embodiment can automatically switch the drive mode and control the respective drive modes so that a high voltage is not applied to the power supply line more than a preset voltage.

On the other hand, when a person operates the physical switch for each driving mode, an unintended regeneration start voltage may be generated due to an operation error of the switch, and the robot may fall over.

However, the device with built-in regenerative circuit of the present embodiment includes a regenerative circuit. The regenerative circuit determines a plurality of types of power sources having different input voltages, and automatically sets a regeneration start voltage corresponding to the determined input voltage of the power source. Specifically, the regenerative circuit uses a passive element such as a resistor or a diode to determine a plurality of types of power supplies having different input voltages, and sets a regeneration start voltage corresponding to the determined input voltage of the power supply. Therefore, it is possible to save the time and effort for manually resetting the regeneration start voltage of the regenerative circuit each time the type of the power supply is switched. Further, since the regenerative circuit built-in device of the present embodiment changes the regenerative start voltage according to the voltage of the type of the power supply, it is possible to perform circuit protection suitable for the type of the power supply without separately preparing a transformer. Hereinafter, a description will be given with reference to the drawings.

First, a robot will be described as an example of a device with a built-in regenerative circuit incorporating a regenerative circuit. Note that the device with built-in regenerative circuit is applicable not only to a robot but also to any device with built-in regenerative circuit, such as a mobile device.

FIG. 1 is a configuration diagram exemplifying a wiring configuration of a power system of a robot including a regenerative circuit according to an embodiment. As illustrated in FIG. 1, the robot 1 includes a regenerative circuit 100. The robot 1 includes, for example, an upper body 10, a left foot 20, and a right foot 30.

The upper body 10 includes a battery BTR, a precharge PCH, and a terminal block TS1. The upper body 10 may include other members. The battery BTR and the precharge PCH are connected via the connectors 11 and 12. The terminal block TS1 is connected to the precharge PCH via a diode-connector. Therefore, the terminal block TS1 is connected to the battery BTR via a diode, a connector, a precharge PCH, and connectors 11 and 12. The terminal block TS1 is connected to a separate power supply PS disposed externally. The terminal block TS1 is a connecting terminal for connecting a motor driver, a motor, and the like. In addition, the terminal blocks TS2 to TS5 to be described below are also connection terminals to which a motor driver, a motor, and the like are connected.

The left foot 20 includes a terminal block TS2 and a TS3. The left foot 20 may include other members. The terminal block TS2 and TS3 are connected to the power distribution unit 40. The power distribution unit 40 is connected to the precharge PCH via a diode-connector. Therefore, the terminal block TS2 and TS3 are connected to the battery BTR via the power distribution unit 40, the diode, the connector, the precharge PCH, and the connectors 11 and 12. The terminal block TS2 and TS3 are connected to a separate power supply PS disposed externally via diodes.

The right foot 30 includes a terminal block TS4 and a TS5. The right foot 30 may include other members. The terminal block TS4 and TS5 are connected to the power distribution unit 40. The power distribution unit 40 is connected to the precharge PCH via a diode-connector. Therefore, the terminal block TS4 and TS5 are connected to the battery BTR via the power distribution unit 40, the diode, the connector, the precharge PCH, and the connectors 11 and 12. The terminal block TS4 and TS5 are connected to a separate power supply PS disposed externally via diodes.

The power distribution unit 40 is disposed, for example, between the upper body 10 and the left foot 20 and the right foot 30. The power distribution unit 40 distributes the electric power supplied from the battery BTR to the terminal blocks TS2 and TS3 of the left foot 20 and the terminal blocks TS4 and TS5 of the right foot 30.

The battery BTR may, for example, provide power at a first voltage that is higher than the separate power supply PS. The separate power supply PS may, for example, provide power at a second voltage that is lower than the battery BTR. As described above, a device such as the robot 1 uses a battery BTR and a separate power supply PS in combination. The voltage of the power supplied by the battery BTR may differ from the voltage of the power supplied by the separate power supply PS.

The regenerative circuit 100 is connected to the power distribution unit 40, for example. Thus, the regenerative circuit 100 is connected to the battery BTR via the power distribution unit 40, the diode, the connector, the precharge PCH, and the connectors 11 and 12. Further, the regenerative circuit 100 is connected to a separate power supply PS disposed externally via the power distribution unit 40, the terminal block TS2 to TS5, and the diode.

A regenerative resistor may be connected to the regenerative circuit 100. The regenerative circuit 100 causes a current based on electric power to flow through the regenerative resistor when the voltage of the power supply line is greater than a predetermined threshold value due to a back electromotive force or the like. The regenerative resistor converts high voltage power into heat or the like. In this way, the regenerative circuit 100 protects the motor driver or the like of the robot 1 from applying a voltage higher than the threshold value. For example, when the power supply is driven by the battery BTR, the regenerative circuit 100 causes a current to flow through the regenerative resistor when the power supply line reaches the first predetermined voltage. When driving in the separate power supply PS, the regenerative circuit 100 causes a current to flow through the regeneration resistor when the second predetermined voltage lower than the first predetermined voltage is reached.

The regenerative circuit 100 may include a sensing wire SL connected to the connector 11. When the battery BTR supplies electric power, the sensing wire SL detects a voltage of about the first voltage. When the battery BTR does not supply electric power, that is, when the robot 1 is supplied with electric power from the separate power supply PS, the sensing wire SL detects a 0V degree of electric power.

As described above, the regenerative circuit 100 can determine whether the power supplied to the robot 1 is a battery BTR or a separate power supply PS. When the battery BTR supplies electric power, the regenerative circuit 100 sets a high-voltage of the first predetermined voltage to the first regeneration starting voltage. On the other hand, when the separate power supply PS supplies power, the regenerative circuit 100 sets a voltage that differs from the first regeneration start voltage to the second regeneration start voltage. For example, when the separate power supply PS supplies power, the regenerative circuit 100 sets a second predetermined voltage lower than the first regeneration start voltage to the second regeneration start voltage. The regenerative circuit 100 does not allow a person to switch the regeneration start voltage by a switch or the like, but can automatically switch the regeneration start voltage as a system.

Figure 2:
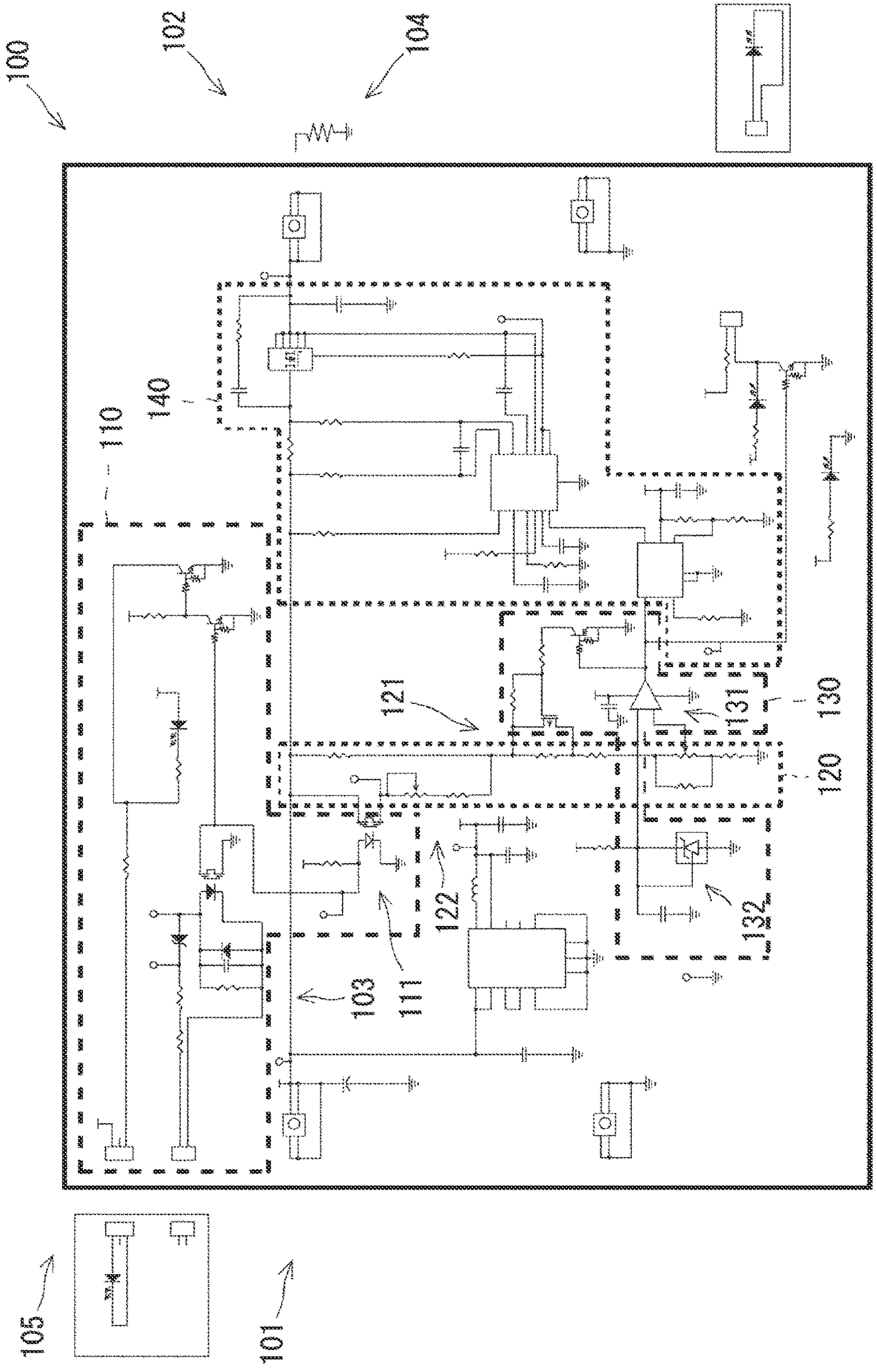
FIG. 2 is a circuit diagram illustrating a substrate of the regenerative circuit according to the embodiment.

Next, the regenerative circuit 100 will be described. FIG. 2 is a circuit diagram illustrating a substrate of the regenerative circuit 100 according to the embodiment. As shown in FIG. 2, the regenerative circuit 100 includes an input terminal 101 and an output terminal 102. A power supply line 103 is connected between the input terminal 101 and the output terminal 102. The input terminal 101 is connected to the power distribution unit 40 described above. The output terminal 102 is connected to the regenerative resistor 104. The power supplied from the power distribution unit 40 is supplied to the power supply line 103 via the input terminal 101.

Further, the regenerative circuit 100 includes a switch unit 110, a voltage-dividing resistor unit 120, a comparison unit 130, and an output unit 140.

The switch unit 110 includes a switch 111. The switch unit 110 may further include an electronic component such as a resistor, a diode, and a capacitor, or may include a part connected to a predetermined constant voltage power supply and grounding in order to ON and OFF the switch 111 at a predetermined voltage. The switch 111 is connected to the sensing wire SL from the sensing inputting terminal 105 via a predetermined electronic component of the switch unit 110.

The switch unit 110 determines the type of the plurality of power sources that differ in the input-voltage via the sensing wire SL. Specifically, when a predetermined high-voltage is supplied from the battery BTR, the switch 111 is configured to be turned OFF. On the other hand, when a predetermined high-voltage is not supplied from the battery BTR, the switch 111 is formed to be turned ON.

As described above, the switch unit 110 has a function of determining the types of the plurality of power sources having different input voltages. The switch 111 may include, for example, a diode and a transistor. When a voltage higher than a predetermined voltage is supplied to the diode, the transistor is turned on. It should be noted that the switch 111 is not limited to a device including a diode and a transistor as long as it is configured to ON when a predetermined voltage is supplied. When the switch 111 is turned ON, the power supply line 103 and the second resistor 122 are electrically connected to each other.

The voltage-dividing resistor unit 120 includes, for example, a first resistor 121 and a second resistor 122. The voltage-dividing resistor unit 120 may further include an electronic component such as a resistor, a diode, and a capacitor, or may include a portion connected to a predetermined constant voltage power supply and ground. With such a configuration, in the voltage-dividing resistor unit portion 120, the combined resistance of the first resistor 121 is different from the combined resistance of the first resistor 121 and the second resistor 122.

One end of the first resistor 121 is connected to the power supply line 103. The variable resistance sliding terminal included in the first resistor 121 is connected to one input terminal of the comparator 131. The other end of the first resistor is grounded. One end of the second resistor 122 is connected to the switch 111. The other end of the second resistor 122 is connected to one input terminal of the comparator 131. The other end of the second resistor 122 may be connected to one input terminal of the comparator 131 via a part of the first resistor 121. As described above, the voltage through the first resistor 121 and the second resistor 122 is input to one input terminal of the comparator 131 as a reference voltage.

Therefore, the voltage-dividing resistor unit 120 makes the reference voltage input to the comparator 131 when the switch 111 is turned ON and the reference voltage input to the comparator 131 when the switch 111 is turned OFF differ from each other.

The comparison unit 130 includes a comparator 131. The comparison unit 130 may further include an electronic component such as a resistor, a diode, and a capacitor, or may include a portion connected to a predetermined constant voltage power supply and ground.

One input terminal of the comparator 131 is connected to the voltage-dividing resistor unit 120. Therefore, the voltage of the voltage-dividing resistor unit 120 when the switch 111 is turned ON or the switch 111 is turned OFF is input to one input terminal of the comparator 131 as a reference voltage. The other input terminal of the comparator 131 is connected to a constant voltage supply unit 132 that supplies a constant voltage. Therefore, a constant voltage is input to the other input terminal of the comparator 131 as a comparison voltage.

Accordingly, the comparator 131 compares the reference voltage when the switch 111 is turned ON or the reference voltage when the switch 111 is turned OFF with the comparative voltage. The comparator 131 outputs a result of the comparison. For example, the comparator 131 outputs a regenerative output voltage when the difference between the voltage of one input terminal and the voltage of the other input terminal is a predetermined voltage. The regenerative output voltage is a voltage that causes the output unit 140 to start regeneration. As a result, the regenerative circuit 100 starts regeneration.

For example, when the switch 111 is turned OFF, the comparator 131 outputs the regenerative output voltage when the voltage of the power supply line 103 reaches the first regenerative start voltage. When the switch 111 is turned ON, the comparator 131 outputs the regenerative output voltage when the voltage of the power supply line 103 reaches the second regenerative start voltage. As a result, the regenerative circuit 100 starts regeneration.

Specifically, for example, the power supply includes a battery BTR that supplies power having an input voltage of a first voltage, and a separate power supply PS that supplies power having an input voltage of a second voltage. If the battery BTR does not provide power, the switch 111 turns ON. Then, since a current flows through the second resistor 122 from the power supply line 103, the comparator 131 sets the voltage applied to the combined resistor including the first resistor 121 and the second resistor 122 as a reference voltage. Since the first resistor 121 and the second resistor 122 are connected in parallel, the comparator 131 can output the regenerative output voltage even when the voltage of the power supply line 103 is a relatively low voltage such as a second predetermined voltage.

On the other hand, when the separate power supply PS supplies power and the battery BTR supplies power, the switch 111 turns OFF. Then, since no current flows through the second resistor 122 from the power supply line 103, the comparator 131 sets the voltage applied to the first resistor 121 as a reference voltage. Since only the first resistor 121 is used, the comparator 131 cannot output the regenerative output voltage unless the voltage of the power supply line 103 becomes a relatively high voltage such as the first predetermined voltage.

In this manner, the power supply includes a first power supply that supplies power having an input voltage equal to or higher than the first voltage, and a second power supply that supplies power having an input voltage equal to or higher than the second voltage that is different from the first voltage. The regeneration start voltage includes a first regeneration start voltage and a second regeneration start voltage different from the first regeneration start voltage. In this case, the switch unit 110 determines the power supply by turning off the switch when the first power supply supplies power. The voltage-dividing resistor unit 120 includes a first resistor 121 and a second resistor 122, and a current based on electric power is supplied to the second resistor 122 when the switch 111 is turned on. The comparison unit 130 compares a predetermined comparison voltage with a reference voltage generated by a combined resistor including the first resistor 121 and the second resistor 122. When the switch 111 is off, the comparison unit 130 outputs the regenerative output voltage when the input voltage reaches the first regenerative start voltage, and when the switch 111 is on, the comparison unit 130 outputs the regenerative output voltage when the input voltage reaches the second regenerative start voltage.

The first voltage may be larger than the second voltage. The first regeneration start voltage may be larger than the second regeneration start voltage. At least a portion of the first resistor 121 is connected in parallel with the second resistor 122. In this way, the regenerative circuit 100 sets the regeneration start voltage corresponding to the determined input voltage of the power supply.

The output unit 140 outputs the current of the power supply line 103 to the regenerative resistor 104 in accordance with the regenerative output voltage output from the comparison unit 130. The regenerative output voltage output from the comparator 131 is input to the output unit 140. The output unit 140 causes the current supplied to the power supply line 103 to flow to the regenerative resistor 104 in accordance with the input regenerative output voltage. As a result, it is possible to suppress the application of a voltage larger than the regeneration start voltage such as the back electromotive force to the circuit of the robot 1.

Figure 3:
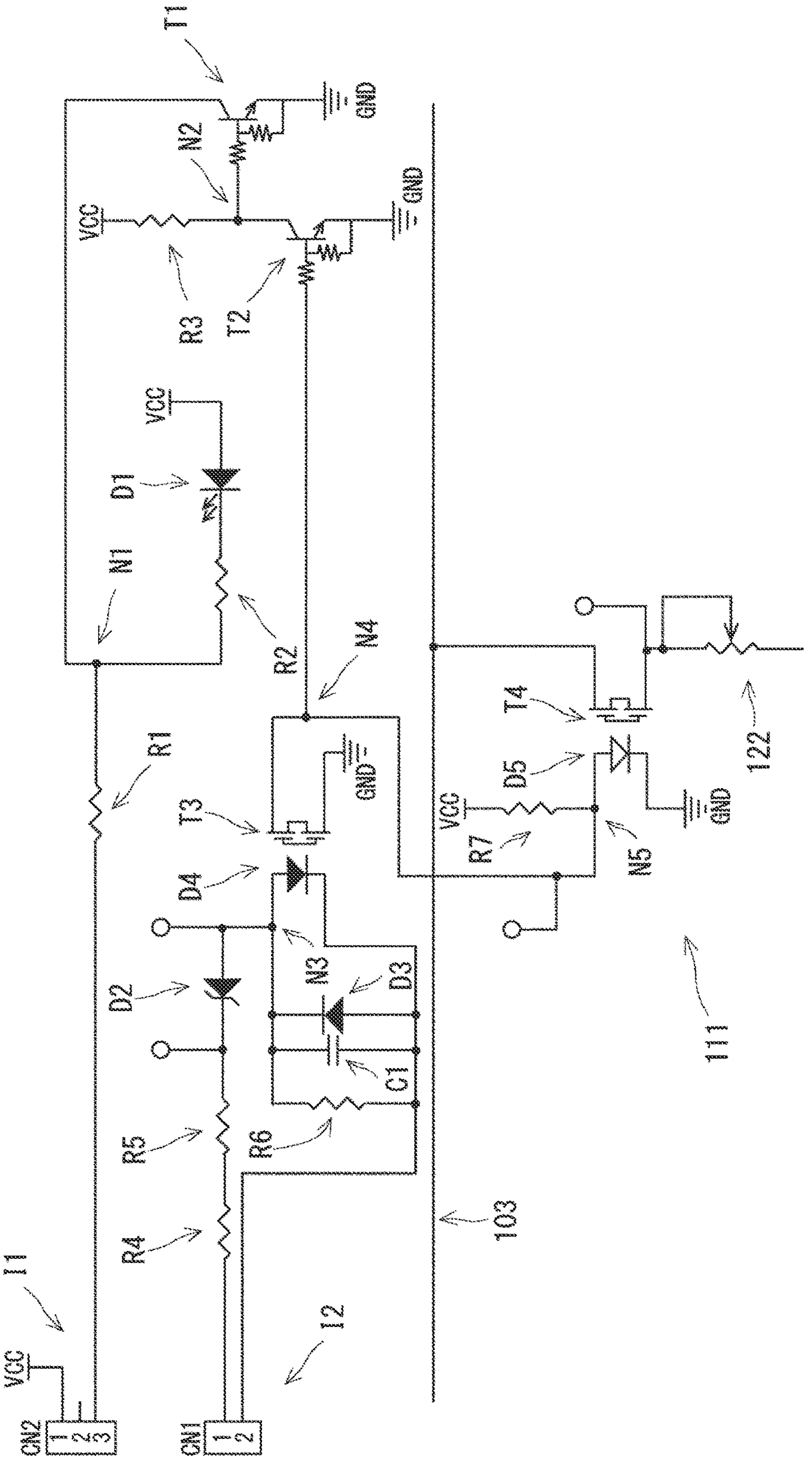
FIG. 3 is a circuit diagram illustrating a switch unit of the regenerative circuit according to the embodiment.

FIG. 3 is a circuit diagram illustrating the switch unit 110 of the regenerative circuit 100 according to the embodiment. As shown in FIG. 3, the switch unit 110 includes input terminals I1 and I2, resistors R1 to R7, contacts N1 to N5, diodes D1 to D5, transistors T1 to T4, and a capacitor C1.

The input terminal I1 is connected to the contact N1 via the resistor R1. The contact N1 is connected to the cathode of the diode D1 via a resistive R2. The diode D1 is, for example, a light-emitting diode. The anode of the diode D1 is connected to the voltage VCC. The contact N1 is connected to the collectors of the transistors T1. The emitter of the transistor T1 is grounded. The base of the transistor T1 is connected to the contact N2. The contact N2 is connected to one end of the resistor R3. The other end of the resistor R3 is connected to the voltage VCC. The contact N2 is connected to the collectors of the transistors T2. The emitter of the transistor T2 is grounded. The base of the transistor T2 is connected to the contact N4.

The input terminal I2 is connected to the cathode of the diode D2 via the resistor R4 and the resistor R5. The diode D2 is, for example, a Zener diode. The anode of the diode D2 is connected to the contact N3. In addition, one end of the resistor R6, one end of the capacitor C1, and an anode of the diode D3 are connected in parallel to the input terminal I2. The other end of the resistor R6, the other end of the capacitor C1, and the cathode of the diode D3 are connected to the contact N3. The anode of the diode D4 is connected to the contact N3, and the cathode of the diode D4 is connected to the input terminal I2.

The diode D4 and the transistor T3 constitute a switch. One end of the transistor T3 is connected to the contact N4. The other end of the transistor T3 is grounded. The contact N4 is connected to the contact N5. The contact N5 is connected to one end of the resistor R7. The other end of the resistor R7 is connected to the voltage VCC. The contact N5 is connected to the anode of the diode D5. The cathode of the diode D5 is grounded.

The diode D5 and the transistor T4 constitute a switch 111. One end of the transistor T4 is connected to the power supply line 103. The other end of the transistor T4 is connected to the second resistor 122.

Figure 4:
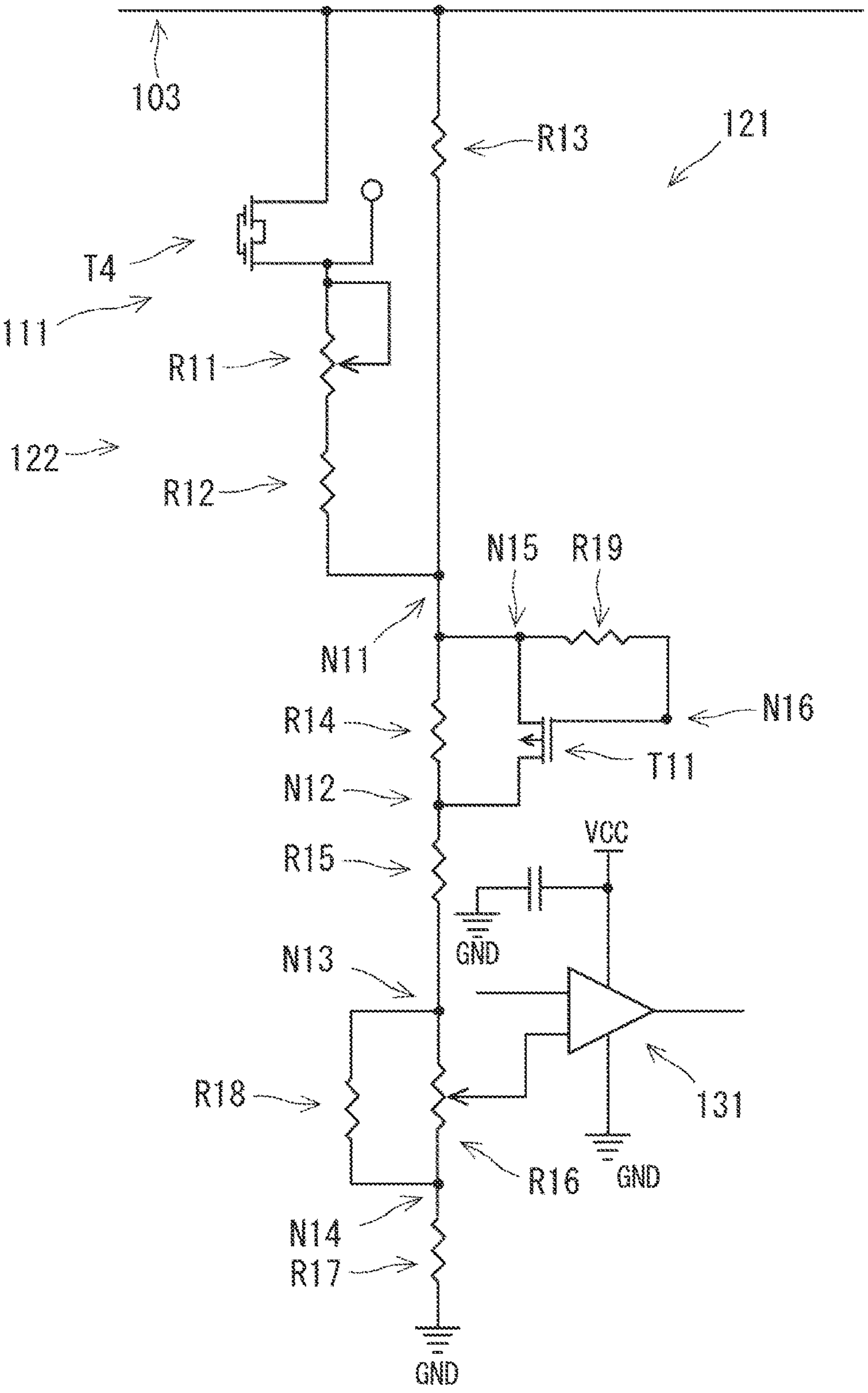
FIG. 4 is a circuit diagram illustrating a voltage-dividing resistor unit of the regenerative circuit according to the embodiment.

FIG. 4 is a circuit diagram illustrating the voltage-dividing resistor unit 120 of the regenerative circuit 100 according to the embodiment. As shown in FIG. 4, the voltage-dividing resistor unit 120 includes a resistor R11 to R19, a contact N11 to N16, and a transistor T11.

The second resistor 122 includes, for example, a resistor R11 and a resistor R12. The other end of the transistor T4 is connected to one end of the resistor R11. The resistor R11 is, for example, a variable resistor. The sliding terminal of the resistor R11 is connected to one end of the resistor R11. The other end of the resistor R11 is connected to the contact N11 via a resistor R12. The first resistor 121 may include R18 from the resistor R13.

One end of the resistor R13 is connected to the power supply line 103. The other end of the resistor R13 is connected to one end of the resistor R14 via a contact N11. The other end of the resistor R14 is connected to one end of the resistor R15 via a contact N12. The other end of the resistor R15 is connected to one end of the resistor R16 via a contact N13. The resistor R16 is, for example, a variable resistor. A sliding terminal of the resistor R16 is connected to an inputting terminal of one end of the comparator 131. The other end of the resistor R16 is connected to one end of the resistor R17 via a contact N14. The other end of the resistor R17 is grounded.

The contact N11 is connected to the transistor T11 via a contact N15. The drain of the transistor T11 is connected to the contact N12. The gate of the transistor T11 is connected to the contact N16. A resistive R19 is connected between the contact N15 and the contact N16. A resistor R18 is connected in parallel with the resistor R16 between the contact N13 and the contact N14.

Figure 5:
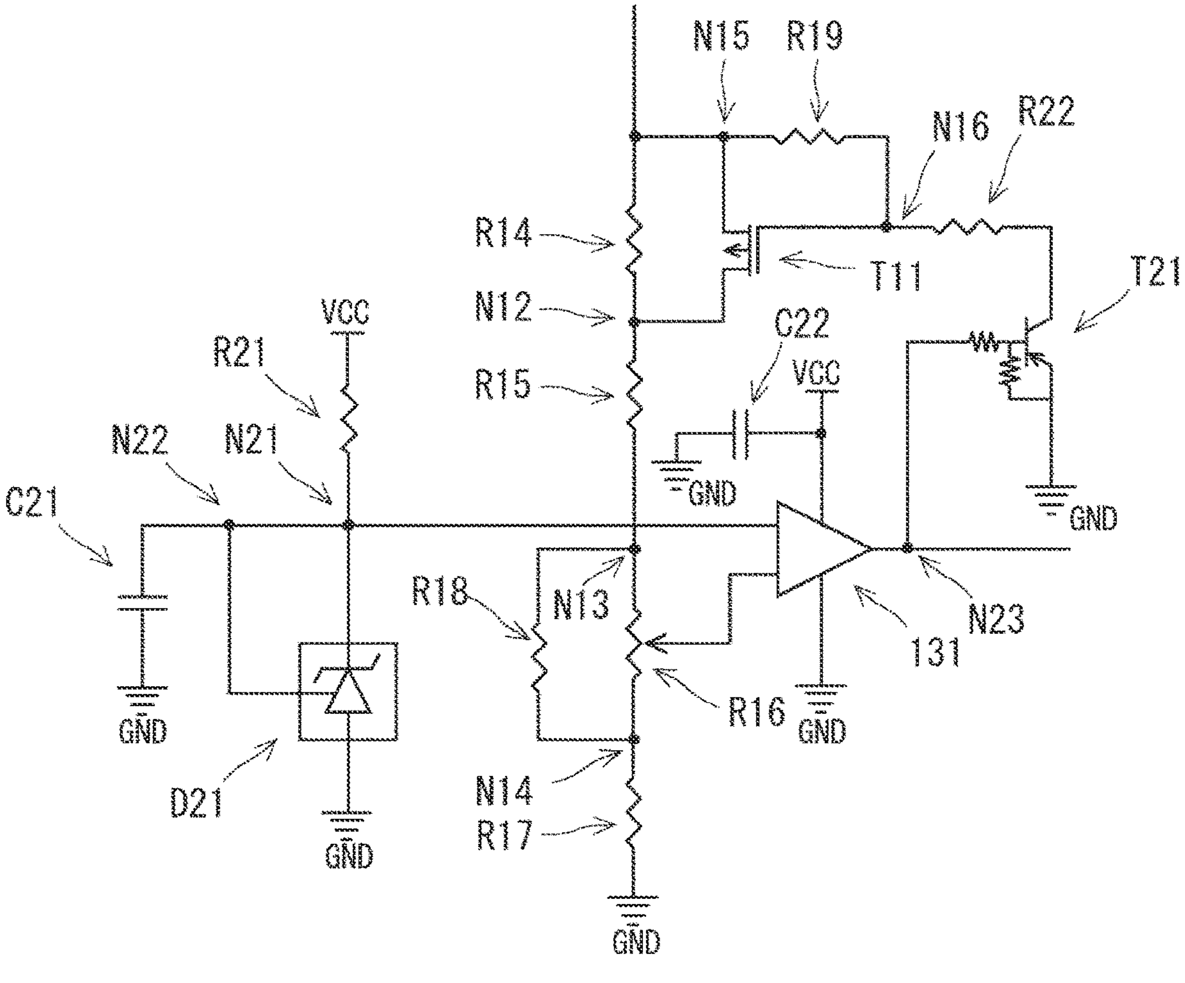
FIG. 5 is a circuit diagram illustrating a comparison unit of the regenerative circuit according to the embodiment.

FIG. 5 is a circuit diagram illustrating the comparison unit 130 of the regenerative circuit 100 according to the embodiment. As shown in FIG. 5, the comparison unit 130 includes a comparator 131, a resistor R21 to R22, a capacitor C21 to C22, a diode D21, a transistor T21, and a contact N21 to N23.

One terminal of the comparator 131 is connected to the sliding terminal of the resistor R16. The other input terminal of the comparator 131 is connected to one end of the capacitor C21 via the contact N21 and the contact N22. The other end of the capacitor C21 is grounded. The contact N21 is connected to one end of the resistor R21. The other end of the resistor R21 is connected to the voltage VCC. The contact N21 is connected to the cathode of the diode D21. The diode D21 is, for example, a Zener diode. The other end of the diode D21 is grounded. The contact N22 may be connected to the diode D21.

One power supply terminal of the comparator 131 is grounded. The other power supply terminal of the comparator 131 is connected to one end of the capacitor C22. The other end of the capacitor C22 is grounded. The other power supply terminal of the comparator 131 is connected to the voltage VCC.

The output terminal of the comparator 131 is connected to the contact N23. The contact N23 is connected to the base of the transistor T21. The emitter of the transistor T21 is grounded. A collector of the transistor T21 is connected to one end of the resistor R22. The other end of the resistor R22 is connected to the contact N16.

Figure 6:
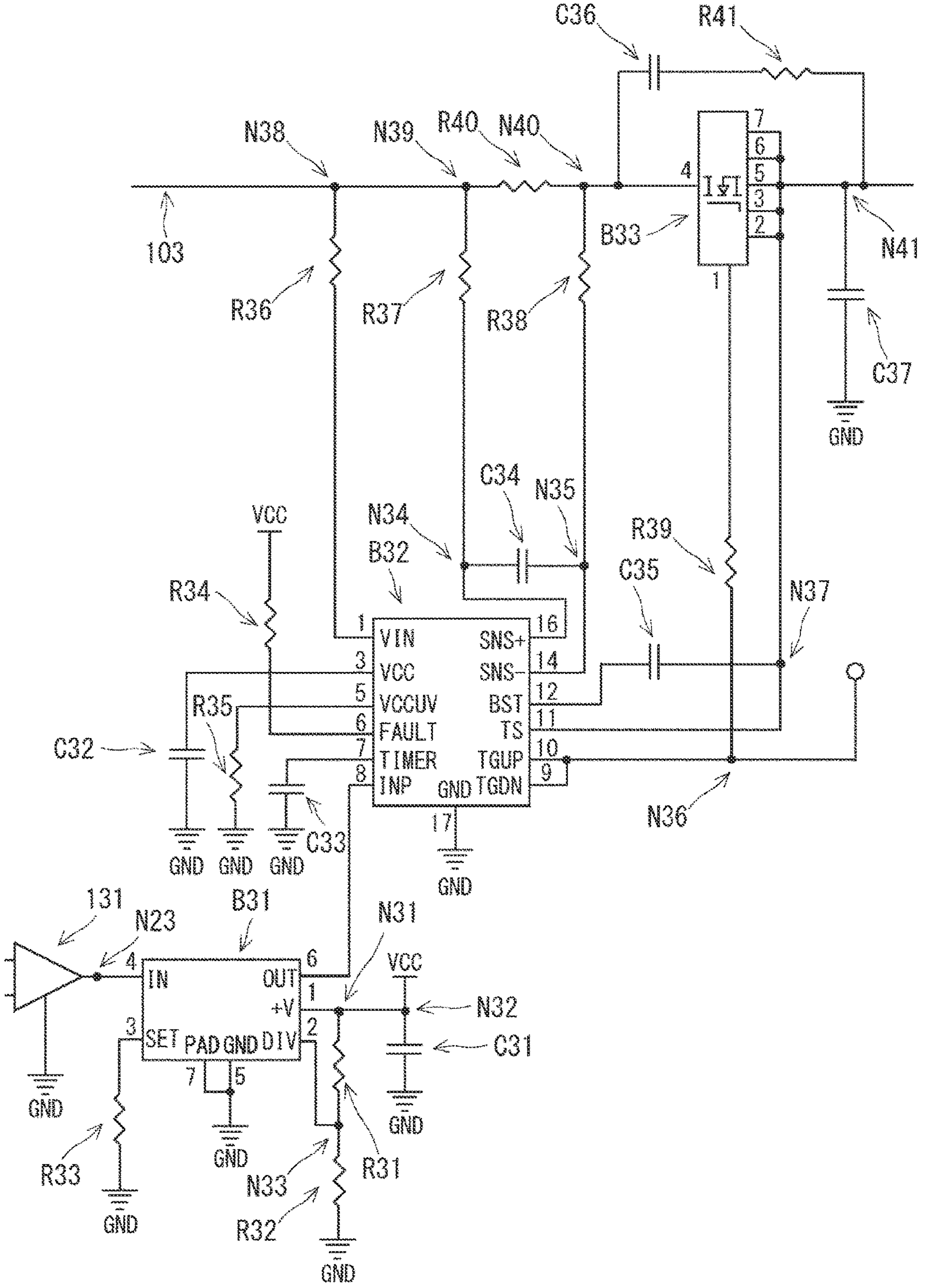
FIG. 6 is a circuit diagram exemplifying an outputting unit of the regenerative circuit according to the embodiment.

FIG. 6 is a circuit diagram illustrating the output unit 140 of the regenerative circuit 100 according to the embodiment. As shown in FIG. 6, the output unit 140 includes a resistor R31 to a R41, a capacitor C31 to a C37, a block B31 to a B33, and a contact N31 to a N41.

The output terminal of the comparator 131 is connected to the contact N23. The contact N23 is connected to the block B31.

The block B31 is, for example, a delay block. Specifically, the block B31 may be, for example, an LTC6994HDCB-1#TRMPBF (analog device). The block B31 has a first terminal to a seventh terminal. The contact N23 is connected to a fourth terminal (IN) of the block B31.

The third terminal (SET) of the block B31 is grounded via a resistor R33. The fifth terminal (GND) and the seventh terminal (PAD) of the block B31 are grounded. A second terminal (DIV) of the block B31 is connected to the contact N33. The contact N33 is grounded via a resistive R32. The first terminal (+V) of the block B31 is connected to the contact N31. The contact N31 is connected to the contact N32. The contact N32 is connected to the voltage VCC. The contact N32 is grounded via the capacitor C31. A resistor R31 is connected between the contact N31 and the contact N33. A sixth terminal (OUT) of the block B31 is connected to the block B32.

The block 32 is, for example, a gate driver. Specifically, the block B32 may be, for example, an LTC7000HMSE-1#PBF (analog device). The block B32 has a plurality of terminals.

The sixth terminal (OUT) of the block B31 is connected to the eighth terminal (INP) of the block B32. The seventh terminal (TIMER) of the block B32 is grounded via the capacitor C33. A sixth terminal (FAULT) of the block B32 is connected to the voltage VCC via a resistor R34. The fifth terminal (VCCUV) of the block B32 is grounded via a resistor R35. The third terminal (VCC) of the block B32 is grounded via the capacitor C32. The first terminal (VIN) of the block B32 is connected to the power supply line 103 at a contact N38 via a resistor R36.

The seventeenth terminal (GND) of the block B32 is grounded. The ninth terminal (TGDN) and the tenth terminal (TGUP) of the block B32 are connected to the contact N36. The eleventh terminal (TS) of the block B32 is connected to the contact N37. The twelfth terminal (BST) of the block B32 is connected to the contact N37 via the capacitor C35. A fourteenth terminal (SNS−) of the block B32 is connected to the contact N35. A sixteenth terminal (SNS+) of the block B32 is connected to the contact N34.

A capacitor C34 is connected between the contact N34 and the contact N35. The contact N34 is connected to the power supply line 103 at a contact N39 via a resistor R37. The contact N35 is connected to the contact N40 via a resistive R38. The power supply line 103 is connected to one end of the resistor R40 via a contact N38 and a contact N39. The other end of the resistor R40 is connected to the contact N40. The contact N40 is connected to the blocking B33.

The blocking B33 is, for example, a MOSFET. Specifically, the blocking B33 may be, for example, IPB044N15N5ATMA1 (Infineon Technologies). The blocking B33 has a plurality of terminals. The contact N40 is connected to the fourth terminal of the blocking B33. The first terminal of the blocking B33 is connected to the contact N36 via a resistor R39. Second terminal of the blocking B33, the third terminal, the fifth terminal, the sixth terminal, and the seventh terminal is connected to the contact N37. Further, the second terminal of the blocking B33, the third terminal, the fifth terminal, the sixth terminal, and the seventh terminal is connected to the contact N41. The contact N41 is grounded via the capacitor C37.

A capacitor C36 and a resistor R41 may be connected between the contact N40 and the contact N41 in parallel with the blocking B33.

Although the embodiments of the present disclosure have been described above, the present disclosure includes appropriate modifications that do not impair the objects and advantages thereof, and further, the present disclosure is not limited by the above-described embodiments. Further, each configuration in the embodiment may be combined as appropriate.

What is claimed is:

1. A device with a built-in regenerative circuit, comprising a regenerative circuit, wherein:
- the regenerative circuit
  - determines a plurality of types of power supplies having different input voltages, and
  - sets a regeneration start voltage corresponding to the input voltage of the determined power supply;
- the power supplies include
  - a first power supply for supplying power having the input voltage equal to or higher than a first voltage, and
  - a second power supply for supplying power having the input voltage equal to or higher than a second voltage different from the first voltage;
- the regeneration start voltage includes
  - a first regeneration start voltage, and
  - a second regeneration start voltage different from the first regeneration start voltage;
- the regenerative circuit includes
  - a switch unit for determining the power supply by turning on a switch when the second power supply supplies the power,
  - a voltage-dividing resistor unit including a first resistor and a second resistor, the voltage-dividing resistor unit supplying a current based on the power to the second resistor when the switch is turned on,
  - a comparison unit for comparing a predetermined comparison voltage and a reference voltage due to a combined resistor including the first resistor and the second resistor, and
  - an output unit for outputting the current to a regenerative resistor in accordance with a regenerative output voltage output by the comparison unit;
- when the switch is on, the comparison unit outputs the regenerative output voltage when the input voltage reaches the second regeneration start voltage; and
- when the switch is off the comparison unit outputs the regeneration output voltage when the input voltage reaches the first regeneration start voltage.

2. The device with a built-in regenerative circuit according to claim 1, wherein:
- the first voltage is greater than the second voltage;
- the first regeneration start voltage is greater than the second regeneration start voltage; and at least a portion of the first resistor is connected in parallel with the second resistor.

* * * * *